US008767641B2

(12) United States Patent
Chen et al.

(10) Patent No.: US 8,767,641 B2

(45) Date of Patent: Jul. 1, 2014

(54) CARRIER INDICATION IN A BANDWIDTH AGGREGATED WIRELESS COMMUNICATIONS SYSTEMS

(75) Inventors: Runhua Chen, Dallas, TX (US); Anthony Ekpenyong, Farmers Branch, TX (US); Eko N. Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/947,229

(22) Filed: Nov. 16, 2010

(65) Prior Publication Data

US 2013/0201921 A1 Aug. 8, 2013

Related U.S. Application Data

(60) Provisional application No. 61/261,490, filed on Nov. 16, 2009.

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| | | | | |
|---|---|---|---|---|
| 2010/0215011 | A1* | 8/2010 | Pan et al. | 370/329 |
| 2010/0254329 | A1* | 10/2010 | Pan et al. | 370/329 |
| 2010/0296467 | A1* | 11/2010 | Pelletier et al. | 370/329 |
| 2011/0021154 | A1* | 1/2011 | Marinier et al. | 455/67.11 |
| 2012/0002643 | A1* | 1/2012 | Chung et al. | 370/331 |
| 2012/0051306 | A1* | 3/2012 | Chung et al. | 370/329 |
| 2012/0113941 | A1* | 5/2012 | Chung et al. | 370/329 |
| 2012/0127950 | A1* | 5/2012 | Chung et al. | 370/329 |
| 2012/0201191 | A1* | 8/2012 | Seo et al. | 370/315 |
| 2013/0010619 | A1* | 1/2013 | Fong et al. | 370/252 |
| 2013/0077585 | A1* | 3/2013 | Pan et al. | 370/329 |

* cited by examiner

*Primary Examiner* — Clemence Han

(74) *Attorney, Agent, or Firm* — Ronald O. Neerings; Wade James Brady; Frederick J. Telecky, Jr.

(57) ABSTRACT

In this invention wireless communication of data between a user equipment and a base station including bandwidth aggregation of a plurality of component carriers, includes a first unit transmitting on a first component carrier a grant control signal the other unit specifying a second component carrier different to transmit the typically via a carrier indication field of 3 bits. The carrier indication field can be a one-to-one mapping to each possible second component carrier of a component carrier offset from an anchor carrier, which could be the first component carrier.

8 Claims, 4 Drawing Sheets

CROSS CARRIER SCHEDULING
411
410
420
430
PDCCH
A
B
C
DATA
431
SPECTRUM

CARRIER INDICATION IN A BANDWIDTH AGGREGATED WIRELESS COMMUNICATIONS SYSTEMS

CLAIM OF PRIORITY

This application claims priority under 35 U.S.C. 119(e)(1) to U.S. Provisional Application No. 61/261,490 filed Nov. 16, 2009.

TECHNICAL FIELD OF THE INVENTION

The technical field of this invention is wireless communication.

BACKGROUND OF THE INVENTION

A carrier is defined as a block of continuous spectrum over which wireless data is transmitted. For example, in Evolved Universal Terrestrial Radio Access (E-UTRA) Long Term Evolution (LTE) Rel-8 standard, a maximum carrier bandwidth of 20 MHz is specified. Carriers of smaller bandwidth (1.4 MHz, 5 MHz, 10 MHz, 15 MHz) are also defined in LTE Rel-8 allowing more flexible use of spectrum, especially when a continuous 20 MHz spectrum is not available. However, an E-UTRA compliant user equipment (UE) must have the capability to transmit/receive over a 20 MHz carrier.

Bandwidth aggregation increases the data rate of a wireless communication system. Bandwidth aggregation aggregates different spectrums (called carriers or component carriers) permitting communication over a wider spectrum. This achieves a higher data rate in both the downlink (DL) and uplink (UL). In LTE-Advanced Rel-10 standard, carrier aggregation is defined for up to 5 component carriers where each component carrier can be up to 20 MHz. Thus the aggregated bandwidth can be as wide as 100 MHz enabling a data rate five times that of the conventional LTE Rel-8 system.

SUMMARY OF THE INVENTION

This invention indexes data carriers for carrier aggregated wireless system with cross-carrier scheduling. This invention efficiently uses the 3-bit carrier indication (CI) fields in the Physical Downlink Control CHannel (PDCCH) to efficiently index the component carrier for data transmission.

This invention includes several methods for component carrier indexing. This application assumes that a maximum of 5 component carriers can be aggregated and there are 3 CI-bits as defined in LTE-A. One skilled in the art would recognize that generalization to other configurations is straight forward.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
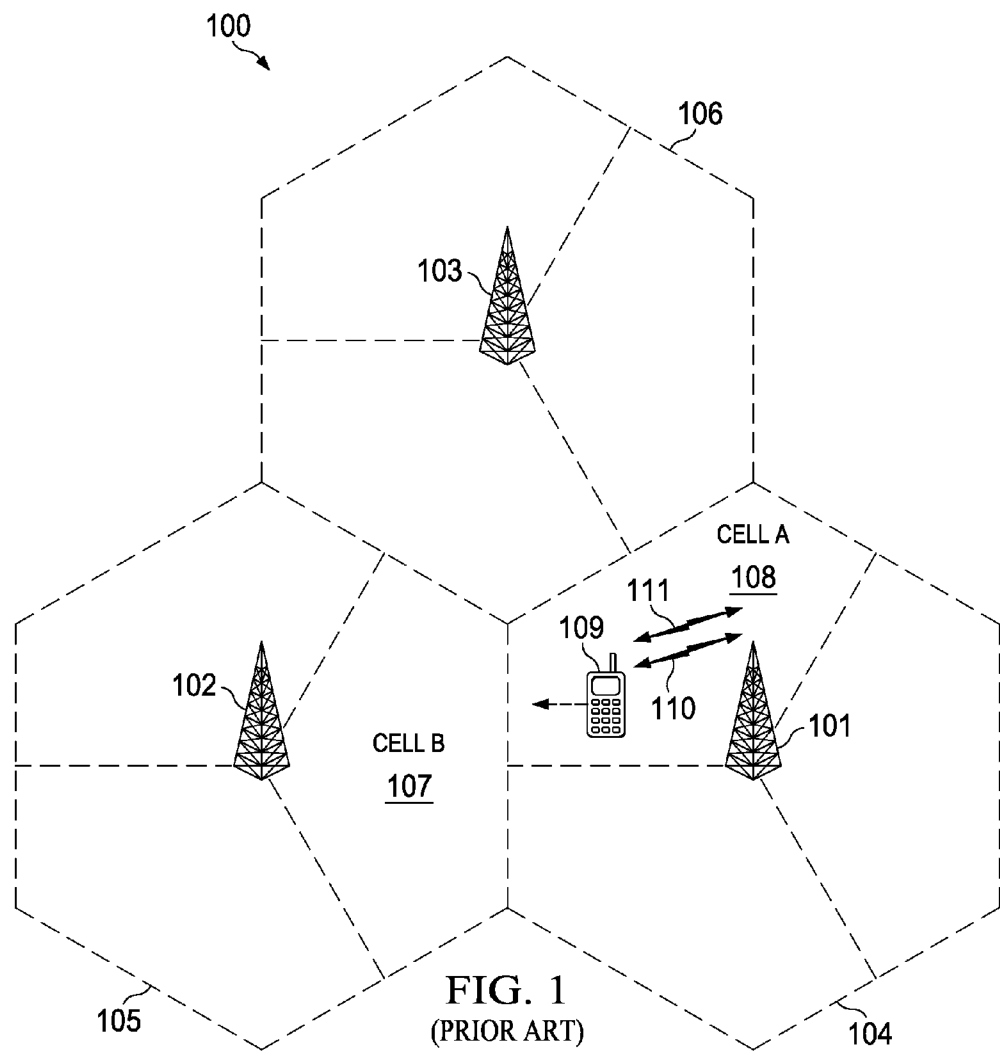
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Figure 2:
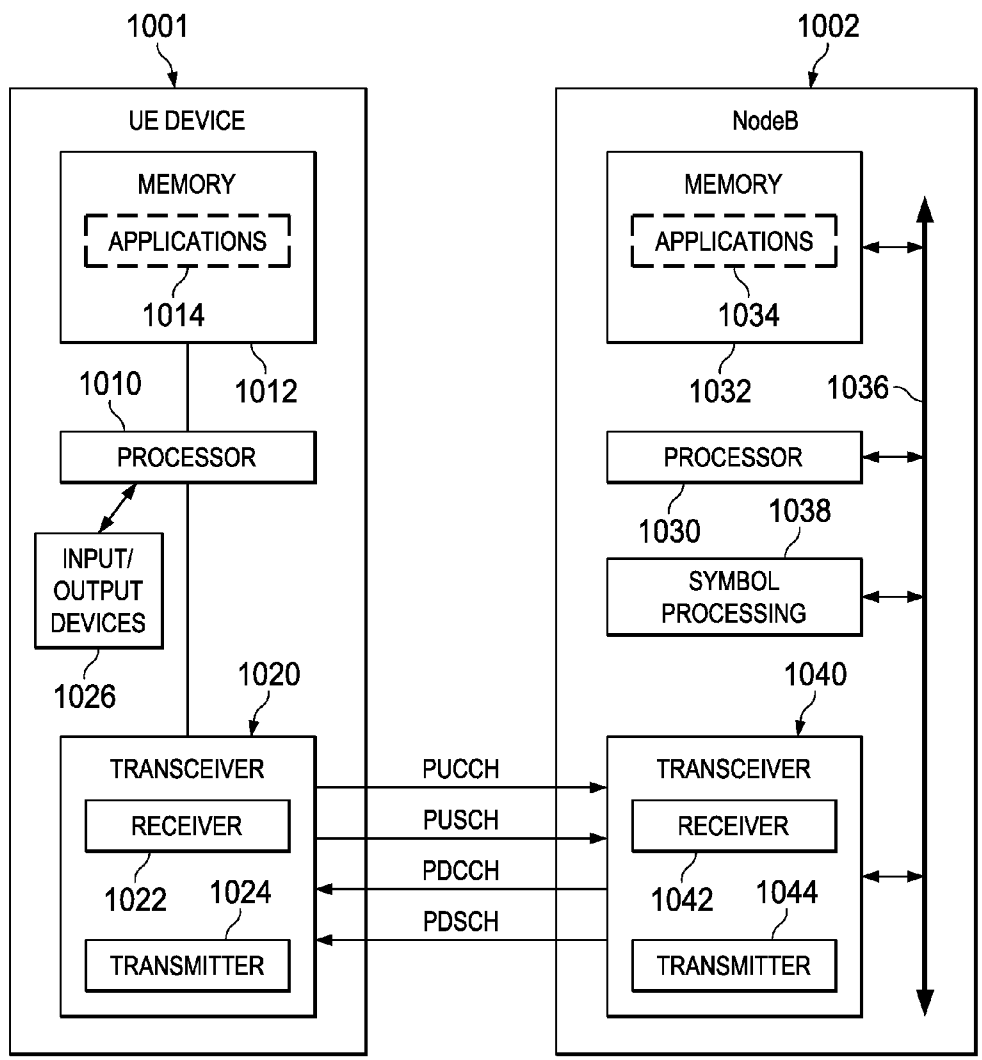
FIG. 2 is a block diagram illustrating internal details of a prior art base station and a prior art mobile user equipment in the network system of FIG. 1.

FIG. 2 is a block diagram illustrating internal details of a NodeB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with the NodeB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to the NodeB (base-station) 1002 periodically or continuously via the transceiver 1020. In at least some embodiments, the mobile UE 1001 identifies a Quality of Service (QoS) requirement when requesting an uplink resource from the NodeB 1002. In some cases, the QoS requirement may be implicitly derived by the NodeB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving NodeB. In this case, it sends a random access signal. As part of this procedure, it determines a preferred size for the next data transmission, referred to as a message, by using a power threshold value provided by the serving NodeB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

NodeB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct NodeB 1002 to manage transmissions to or from mobile UE 1001.

Transceiver 1040 comprises an uplink Resource Manager, which enables the NodeB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of NodeB 1002 and at least one transmitter 1044 for transmitting data and control information to the various UEs within range of NodeB 1002.

The uplink resource manager executes instructions that control the operation of transceiver 1040. Some of these instructions may be located in memory 1032 and executed when needed on processor 1030. The resource manager controls the transmission resources allocated to each UE 1001 served by NodeB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by NodeB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, NodeB 1002 schedules an appropriate set of resources and notifies UE 1001 with a resource grant.

This application uses the following definitions. The component carrier carrying DL/UL PDCCH is defined as the anchor carrier. The component carrier for data transmission is defined as the data carrier. The number of component carriers aggregated for a UE is defined as $N_{DL}$ for DL and $N_{UL}$, for UL. The index of the component carriers is defined as $\{N_1, N_2, \ldots N_L\}$ ordered in an increasing frequency. The number of CI bits in PDCCH is defined as $N_{CI}$.

The following is some additional notes on carrier aggregation in LTE-A. An LTE-A UE can support bandwidth aggregation of maximum of $N_{max}$=5 component carriers. The exact number of aggregated component carriers, is UE specific and depends on the network configuration.

Carrier aggregation can be unbalanced in downlink or uplink. For example, a specific UE may have 3 component carriers be aggregated in the uplink and 5 component carriers aggregated in the downlink. The case of more DL carriers than UL carriers is defined as a DL-centric carrier aggregation scenario. The case of more UL than DL carriers is defined as a UL-centric carrier aggregation scenario.

Different mobile terminals may have different carrier aggregation capability. For example, a first UE may support carrier aggregations of 3 component carriers (60 MHz), while a second UE may support carrier aggregation of 5 component carriers (100 MHz). The exact number of aggregation carriers defined as $N_{DL}$ and $N_{UL}$ is UE specific.

For a specific UE, the aggregated component carriers, in either DL or UL, can be continuous or non-continuous in the frequency domain. For example, consider 3 continuous DL component carriers A, B and C. It is possible for the network to configure DL carrier aggregation over carrier A and C, where B is configured as "inaccessible" to the UE. As a result, wireless data transmission to the UE occurs only on component carriers A and C. Upon receiving the carrier aggregation configuration information, a UE understands which component carriers it can access in DL or UL.

Figure 3:
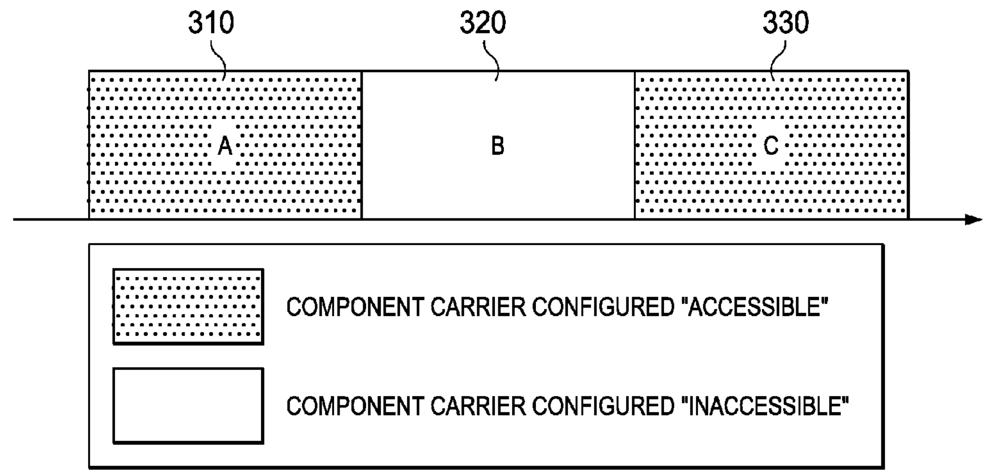
FIG. 3 illustrates an example spectrum of accessible and inaccessible component carriers.

The aggregated carriers can be adjacent (continuous) or non-adjacent (non-continuous) m the frequency domain, as exemplified in FIG. 3. FIG. 3 illustrates the case where carrier A 310, carrier B 320 and carrier C 330 are continuous. In the example of FIG. 3 the UE is configured to aggregate carriers A 310 and C 330. In this example the UE cannot use carrier B 320.

In this disclosure the index of a component carrier is a semi-positive number. For example when a UE is configured with 5 component carriers, the carriers indices are {0, 1, 2, 3, 4}.

Figure 4:
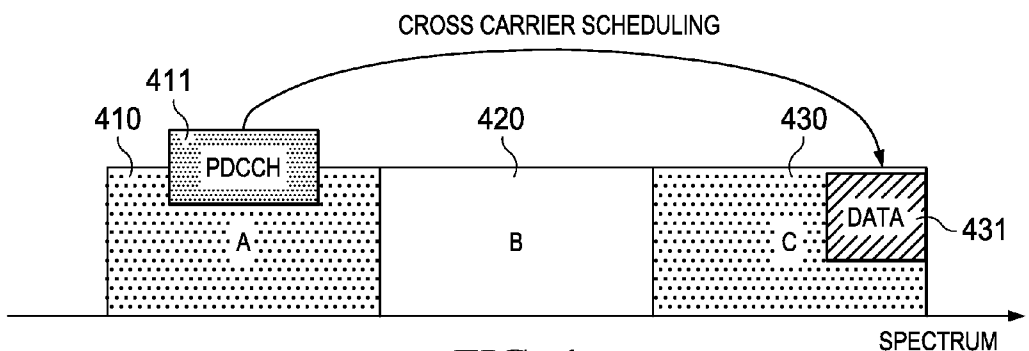
FIG. 4 illustrates an example cross-carrier scheduling where data transmission in a component carrier is scheduled by downlink control signaling in a different component carrier.

Cross-carrier scheduling is an important feature of bandwidth aggregation. In cross-carrier scheduling data transmission in a component carrier is scheduled by downlink control signaling in a different component carrier. FIG. 4 illustrates this feature. A PDCCH transmission 411 in carrier 410 signals that carrier 430 includes data 431. Carrier indication (CI) bits are used to indicate the index of the component carrier of the data transmission. In a DL grant a downlink control signal transmitted from a base station such as base station 101 to a UE such as UE 109 schedules a DL data transmission from base station 101 to UE 109. In a UL grant a downlink control signal transmitted from base station 101 to UE 109 schedules an UL data transmission from UE 109 to base station 101.

Both UL grant and DL grant are transmitted in the downlink physical channel defined as PDCCH. This is transmitted in one component carriers. Different PDCCHs can be transmitted in different component carriers.

In LTE Rel-8 has no carrier aggregation. Thus the DL/UL grant is always transmitted in the same component carrier as the scheduled DL/UL data transmission. LTE-A supports carrier aggregation, thus it is possible to send the DL/UL grant in a different component than the data transmission. Such cross-carrier scheduling capability is especially necessary when using unbalance carrier aggregation in DL/UL. For example, if there is 1 DL component carrier and 3 UL component carriers, cross carrier scheduling is unavoidable, since the PDCCH can only be transmitted in the DL component carrier while uplink data can be transmitted in any of the 3 UL component carriers.

Since carrier aggregation is defined for a maximum of 5 component carriers, the LTE-A standard reserves 3 CI bits for this signaling. This creates the problem of how to define the 3-bits CI fields in the PDCCH for efficient component carrier indexing.

Figure 5:
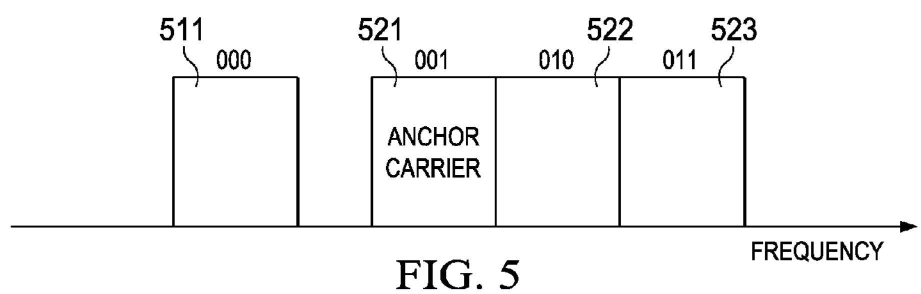
FIG. 5 illustrates an example using a fixed 3-bit CI field for carrier aggregation of three contiguous carrier components and one carrier component which is not contiguous and could be in a different band.

To avoid ambiguity during cross-carrier assignment to the UE, the CI field should have a simple implicit addressing scheme. For example, the CCs can be ordered according to the numerology. FIG. 5 shows an example using a fixed 3-bit CI field for carrier aggregation of three contiguous carrier components and one carrier component which is not contiguous and could be in a different band. It is assumed that the number of DL and UL carrier components in the cell is provided in the dynamic-broadcast channel (D-BCH). In a first embodiment of this invention, the CI field is an implicit address providing a one-to-one mapping between the binary value of the CI field and the corresponding component carrier. As shown in FIG. 5, a CI field of 000 indicates the carrier component 511, which is the non-contiguous carrier component. A CI field of 001 indicates the anchor carrier component 521. A CI field of 010 indicates the carrier component 523. A CI field of 011 indicates the carrier component 523.

The 3 bits CI field is able to indicate a total of 8 different component carriers, although a UE can only support a maximum of 5 component carriers. Since the data carrier can be in a higher frequency or lower frequency than the anchor carrier, it is possible to define the CI indexing more efficiently for scheduling over a broader range of spectrum.

Figure 6:
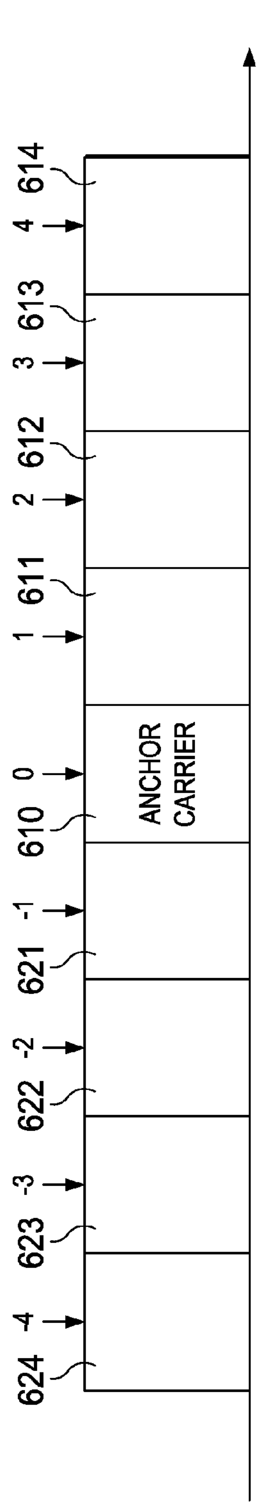
FIG. 6 illustrates an example where the 3-bit CI field is the carrier index offset

FIG. 6 illustrates an embodiment of this invention where the 3-bit CI field in the PDCCH is the carrier index offset CC offset. This is the offset between the index of the data component carrier with respect to the index of the anchor carrier. The index of the data carrier is obtained from the index of the anchor carrier and the carrier index offset in PDCCH. A positive offset value indicates that the data carrier is at a higher frequency than the anchor carrier. A negative offset value indicates that the data carrier is in a lower frequency. Alternately the offset value could be coded oppositely. FIG. 6 illustrates anchor carrier 610, higher frequency carrier components 611, 612, 613 and 614, and lower frequency carrier components 621, 622, 623 and 624.

The following is an example of this coding. Two exampled of the set of possible values for the component carrier offset are as follows:

$$CC\_offset \bullet \{-2^{Nc1}/2, -2^{Nc1}/2+1 \ldots 2Nc1/2\} + \bullet$$

$$CC\_offset \bullet \{-N_{max}, \ldots N_{max-1}1, \ldots N_{max}\} + \bullet$$

where • is higher-layer configured constant. For example when $N_{C1}$ is 3, the set can be {−4, −3, −2, −1, 0, 1, 2, 3, 4}. Table 1 shows an exemplary mapping between the CC_offset and 3-bits CI fields in the PDCCH.

TABLE 1

| CC_offset | 3-Bit CI Field |
|---|---|
| −4 | — |
| −3 | 111 |
| −2 | 110 |
| −1 | 101 |
| 0 | 000 |
| 1 | 001 |
| 2 | 010 |
| 3 | 011 |
| 4 | 100 |

Note that the CC_offset value of −4 is reserved because the 3-bit CI field can only support 8 possible offset value. If n is the index of the anchor carrier the (n−4)th component carrier cannot be scheduled.

Which CC_offset value to be reserved and not encoded in the 3 CI bits depends upon the network configuration and can be signaled by higher layer signaling. In a first alternative, upon receiving the PDCCH on the n-th component carrier, the index of the data carrier is obtained as:

$$n + CC\_offset$$

In a second alternative, the data carrier is indexed by the modified carrier as:

$$\mathrm{mod}(n + CC\_offset, N_{max})$$

where: $N_{max}$ is the maximum number of aggregated carrier in a standard. $N_{max}$ is 5 for LTE-A. In a third alternative, the data carrier is indexed by the modified carrier as:

$$\mathrm{mod}(n + CC\_offset, N_{DL})$$

for DL, or $$\mathrm{mod}(n + CC\_offset, N_{UL})$$

for UL, where: $N_{DL}$ and $N_{UL}$ are UE specific values of respective downlink and uplink carrier aggregation configured by the network.

Figure 7:
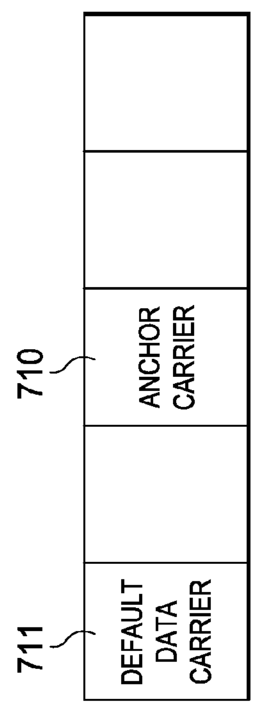
FIG. 7 illustrates an example spectrum including an anchor carrier and a default data carrier.
Figure 8:
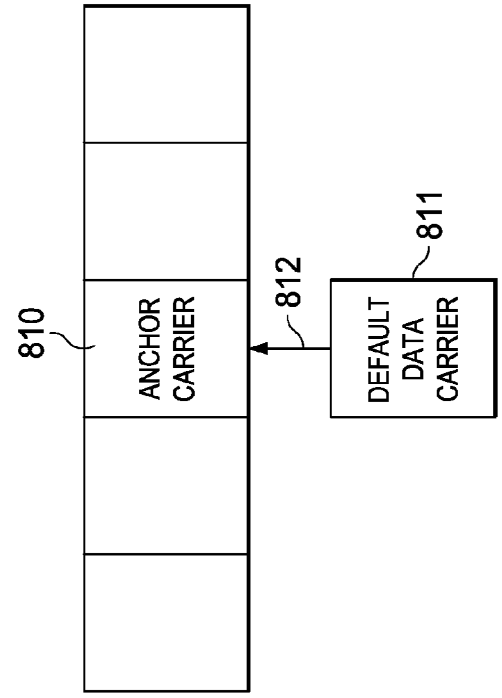
FIG. 8 illustrates an example spectrum including an anchor carrier and a default data carrier with a default carrier offset.

For any of the encodings proposed above, if the resultant data carrier is not accessible to the UE such as by the D-BCH, the following solutions possible alternatives. In a first alternative, the UE assumes a network mis-configuration and discards the PDCCH. In a second alternative, the UE assumes a network mis-configuration and selects a default data carrier. This default data carrier can be configured by higher communication layer. FIG. 7 illustrates an example spectrum including anchor carrier 710 and default data carrier 711. In the example of FIG. 7 the UE may assumes that the component carrier of the lowest frequency component carrier 711 is the data carrier. In a third alternative, the UE assumes a network mis-configuration, but assumes a default component carrier offset for the data carrier indexing. FIG. 8 illustrates an example spectrum including anchor carrier 810 and default data carrier 811 having a default carrier offset 812. The default carrier offset 812 may be configured by higher communication layer. The network may configure the default carrier offset to be 0, which means that the anchor carrier is by default the data carrier. In a fourth alternative the UE behavior for a network mis-configuration is not defined. Note that the second and third alternatives may be used even without CI mis-configuration.

What is claimed is:

1. A method of wireless communication of data between a user equipment and a base station including bandwidth aggregation of a plurality of component carriers, comprising the steps of:

a first unit of the user equipment or the base station transmitting in a first component carrier to the other unit of the user equipment or the base station a grant control signal indicating grant of schedule to transmit data from said other unit to said first unit, said grant control signal specifying a second component carrier different from said first component carrier to transmit said data;

said first unit transmits a carrier indication field indicating said second component carrier;

said carrier indication field includes an encoding specifying a component carrier offset from an anchor carrier; and said other unit transmitting said data to said first unit on said second component carrier.

2. A method of wireless communication of data between a user equipment and a base station including bandwidth aggregation of a plurality of component carriers, comprising the steps of:

a first unit of the user equipment or the base station transmitting in a first component carrier to the other unit of the user equipment or the base station a grant control signal indicating grant of schedule to transmit data from said other unit to said first unit, said grant control signal specifying a second component carrier different from said first component carrier to transmit said data;

said first unit transmits a carrier indication field indicating said second component carrier;

said carrier indication field includes an encoding specifying a component carrier offset from an anchor carrier;

a positive carrier indication field specifies a component carrier having a frequency higher than a frequency of said anchor carrier; and a negative carrier indication field specifies a component carrier having a frequency lower than said frequency of said anchor carrier; and said other unit transmitting said data to said first unit on said second component carrier.

3. A method of wireless communication of data between a user equipment and a base station including bandwidth aggregation of a plurality of component carriers, comprising the steps of:

a first unit of the user equipment or the base station transmitting in a first component carrier to the other unit of the user equipment or the base station a grant control signal indicating grant of schedule to transmit data from said other unit to said first unit, said grant control signal specifying a second component carrier different from said first component carrier to transmit said data;

said first unit transmits a carrier indication field indicating said second component carrier;

said carrier indication field includes an encoding specifying a component carrier offset from said first component carrier; and said other unit transmitting said data to said first unit on said second component carrier.

4. A method of wireless communication of data between a user equipment and a base station including bandwidth aggregation of a plurality of component carriers, comprising the steps of:

a first unit of the user equipment or the base station transmitting in a first component carrier to the other unit of the user equipment or the base station a grant control signal indicating grant of schedule to transmit data from said other unit to said first unit, said grant control signal specifying a second component carrier different from said first component carrier to transmit said data;

said first unit transmits a carrier indication field indicating said second component carrier;

said carrier indication field includes an encoding specifying a component carrier offset from said first component carrier as:

$$\mathrm{mod}(n+CC\_offset,N_{max})$$

where: n is the index of the first component carrier; CC_offset is an offset indicated by said component carrier offset; and $N_{max}$ is the maximum number of aggregated carriers; and said other unit transmitting said data to said first unit on said second component carrier.

5. A method of wireless communication of data between a user equipment and a base station including bandwidth aggregation of a plurality of component carriers, comprising the steps of:

a first unit of the user equipment or the base station transmitting in a first component carrier to the other unit of the user equipment or the base station a grant control signal indicating grant of schedule to transmit data from said other unit to said first unit, said grant control signal specifying a second component carrier different from said first component carrier to transmit said data;

said first unit transmits a carrier indication field indicating said second component carrier;

said carrier indication field includes an encoding specifying a component carrier offset from said first component carrier as:

$$\mathrm{mod}(n+CC\_offset,N_{DL})$$

for data transmission from said base station to said user equipment, and $$\mathrm{mod}(n+CC\_offset,N_{UL})$$

for data transmission from said user equipment to said base station, where: n is the index of the first component carrier; CC_offset is an offset indicated by said component carrier offset; $N_{DL}$ is a user equipment specific number of component carriers devoted to downlink communication; and $N_{UL}$ is a user equipment specific number of component carriers devoted to uplink communication; and said other unit transmitting said data to said first unit on said second component carrier.

6. A method of wireless communication of data between a user equipment and a base station including bandwidth aggregation of a plurality of component carriers, comprising the steps of:

a first unit of the user equipment or the base station transmitting in a first component carrier to the other unit of the user equipment or the base station a grant control signal indicating grant of schedule to transmit data from said other unit to said first unit, said grant control signal specifying a second component carrier different from said first component carrier to transmit said data;

said first unit transmits a carrier indication field indicating said second component carrier;

said first unit transmits said carrier indication field via physical downlink control channel; and if said carrier indication field erroneously indicates an inaccessible component carrier, said other unit aborts data transmission.

7. A method of wireless communication of data between a user equipment and a base station including bandwidth aggregation of a plurality of component carriers, comprising the steps of:

a first unit of the user equipment or the base station transmitting in a first component carrier to the other unit of the user equipment or the base station a grant control signal indicating grant of schedule to transmit data from said other unit to said first unit, said grant control signal specifying a second component carrier different from said first component carrier to transmit said data;

said first unit transmits a carrier indication field indicating said second component carrier;

said first unit transmits said carrier indication field via physical downlink control channel; and if said carrier indication field erroneously indicates an inaccessible component carrier, said other unit transmits data on a default second component carrier.

8. A method of wireless communication of data between a user equipment and a base station including bandwidth aggregation of a plurality of component carriers, comprising the steps of:

a first unit of the user equipment or the base station transmitting in a first component carrier to the other unit of the user equipment or the base station a grant control signal indicating grant of schedule to transmit data from said other unit to said first unit, said grant control signal specifying a second component carrier different from said first component carrier to transmit said data;

said first unit transmits a carrier indication field indicating said second component carrier;

said first unit transmits said carrier indication field via physical downlink control channel; and if said carrier indication field erroneously indicates an inaccessible component carrier, said other unit transmits data on a default second component carrier having a default offset from an anchor carrier.

* * * * *